United States Patent
Capmany Francoy et al.

(10) Patent No.: US 9,239,425 B2
(45) Date of Patent: Jan. 19, 2016

(54) TUNEABLE AWG DEVICE FOR MULTIPLEXING AND DEMULTIPLEXING SIGNALS AND METHOD FOR TUNING SAID DEVICE

(75) Inventors: José Capmany Francoy, Valencia (ES); Pascual Muñoz Muñoz, Valencia (ES); Mauricio Morais De Lima, Valencia (ES); Paulo V. Santos, Berlin (DE)

(73) Assignees: UNIVERSIDAD POLITÉCNICA DE VALENCIA CAMINO DE VERA, Valencia (ES); UNIVERSITAT DE VALENCIA, Valencia (ES); PAUL DRUDE INSTITUT FUER FESTKOERPERELETRONIK, Berlin (DE)

( * ) Notice: Subject to any disclaimer, the term of this patent is extended or adjusted under 35 U.S.C. 154(b) by 73 days.

(21) Appl. No.: 14/116,942

(22) PCT Filed: May 11, 2012

(86) PCT No.: PCT/ES2012/070335
§ 371 (c)(1),
(2), (4) Date: Feb. 18, 2014

(87) PCT Pub. No.: WO2012/152977
PCT Pub. Date: Nov. 15, 2012

(65) Prior Publication Data
US 2014/0178004 A1   Jun. 26, 2014

(30) Foreign Application Priority Data

May 11, 2011   (ES) .................................. 201130746

(51) Int. Cl.
*G02B 6/12* (2006.01)
*G02F 1/125* (2006.01)

(52) U.S. Cl.
CPC ........ *G02B 6/12011* (2013.01); *G02B 6/12016* (2013.01); *G02F 1/125* (2013.01); *G02B 6/12033* (2013.01)

(58) Field of Classification Search
CPC ...................................................... G02F 1/125
See application file for complete search history.

(56) References Cited

U.S. PATENT DOCUMENTS

| 5,559,906 A | 9/1996 | Maerz |
| 2002/0080715 A1 | 6/2002 | Weber |

FOREIGN PATENT DOCUMENTS

GB   2368402   5/2002

*Primary Examiner* — Jerry Rahll
(74) *Attorney, Agent, or Firm* — Blakely Sokoloff Taylor & Zafman LLP

(57) ABSTRACT

The invention relates to a tuneable AWG device for multiplexing and demultiplexing signals and to a method for tuning said device. The inventive device is an integrated-optic device which enables a signal made up of a plurality of signals multiplexed by wavelength division to be injected through an input port such as to obtain, at the output, a demultiplexed signal with each component exiting via a different port. If the multiplexed signal is changed to another input port, the demultiplexed signals appear at different ports, but always according to a pre-determined relationship. The invention makes it possible to tune the AWG device by using stationary acoustic waves such that the acoustically excited optical guides are excited by a linear acoustic wave.

21 Claims, 5 Drawing Sheets

TUNEABLE AWG DEVICE FOR MULTIPLEXING AND DEMULTIPLEXING SIGNALS AND METHOD FOR TUNING SAID DEVICE

The present patent application is a national phase application of International Application No. PCT/ES2012/070335, filed May 11, 2012.

OBJECT OF THE INVENTION

The present invention relates to an AWG (Arrayed Waveguide Grating) device. An AWG device is an integrated optical device enabling the introduction of a signal consisting of several signals multiplexed by wavelength division through an input port so that a demultiplexed output signal is obtained with each component exiting through a different port.

If the multiplexed signal is changed to another input port, the demultiplexed signals appear at different ports, but always following an established order.

The present invention allows the tuning of the AWG device using acoustic stationary waves so that the optical waveguides acoustically excited are excited according to a linear acoustic wave.

BACKGROUND OF THE INVENTION

As defined, the AWG device is an integrated optical device that demultiplexes a composite signal such that once the composite signal has been introduced into an input, the demultiplexed signals are obtained at the multiple output ports.

The output at which each of the demultiplexed signals is obtained is determined by the AWG design.

Although a wavelength is the inverse of the frequency, and therefore they are parameters that define the same properties, throughout the description (unless otherwise specified) the term frequency is reserved for acoustic signals and the term wavelength for optical signals.

Describing the basic configuration of an AWG as known in the prior art, it is formed by:
- one or more input ports consisting of optical waveguides,
- a number of output ports consisting of optical waveguides,
- a first optical coupler for optical input port mixing,
- a second optical coupler for the mixing and output of optical output ports,
- a set of optical waveguides with increasing lengths connecting the first optical coupler to the second optical coupler so as to enable the multiplexing/demultiplexing of signals transmitted.

For the sake of simplicity, it is assumed that the AWG device has a single input. The composite signal entering this input is distributed by the first optical coupler over the entire set of optical waveguides with increasing lengths.

The optical signal that travels through each of the guides will reach the second optical coupler. Since each optical guide has a different length, the route will also be different.

The set of optical waveguides with increasing lengths leads to a selection of output ports depending on the frequency of the optical signal due to a phenomenon of constructive interference that causes light to diffract in one port or another.

The fixed length set of guides with increasing lengths means that the mode in which the outputs are distributed depending on the input is already preset at the design stage and that this distribution cannot change during operation.

If instead of a single input, the device comprises more than one input, there is an output distribution for each input. However, the output distribution is also established during the design stage and cannot change during operation.

For instance, if the multiplexed signal is introduced into input port 1, the demultiplexed signal with a wavelength of λ1 will exit through output port 1, signal λ2 will exit through output port 2, signal λ3 will exit through output port 3, and so on. But if the input port of the multiplexed signal is input port 2, the demultiplexed signal with a wavelength of λ1 will exit through output port 2, signal λ2 will exit through output port 3, signal λ3 will exit through output port 4 and so on. So, the relationship between input and output remains preset.

One way to get around this limitation is to modify the refractive index of optical waveguides along which the optical signal travels. This will modify the propagation conditions of light inside the guides and AWG behaviour can change during operation.

The prior art discloses proposals of technical solutions aimed at modifying the refractive index to enable AWG tuning.

In particular, the patent application with publication number US2002/0080715A1 describes and claims a first method for refractive index variation by changing the temperature of the guides.

While this method of varying the refractive index is feasible, the temperature changes are not immediate and require a long transition time. The thermal inertia prevents this change from being almost instantaneous.

This very same application US2002/0080715A1 addresses the possibility of using acoustic waves since they also modify the refractive index. Although this solution is presented generically and is even claimed, the application itself acknowledges that is not feasible since it requires a constant change rate. The patent application does not disclose a solution to this problem.

The present invention solves the above problem by establishing a particular mode of acoustic excitation on the optical waveguides. The result is the tuning of the AWG whose change response is almost instantaneous. The invention also covers various configurations that result in particular devices that benefit from the AWG tuning.

DESCRIPTION OF THE INVENTION

The present invention is an acoustically tuneable AWG. The AWG according to the invention comprises:
- one or more input ports consisting of optical waveguides,
  These are the signal input ports (one signal, or several signals in the event of various input ports), said signal comprising several multiplexed signals by wavelength division.
- a number of output ports consisting of optical waveguides,
  Once the signal (or signals in the case of several input ports) has been demultiplexed, each signal differentiated from the others in its wavelength exits through a different output. AWG tuning will make it possible to vary the possible output signal distributions throughout the set of output ports.
- a first optical coupler for optical input port mixing.
  This first optical coupler makes it possible to distribute the input on different optical waveguides, which are introduced further on.
- a second optical coupler for the mixing and output of optical output ports;

the second optical coupler collects the signals distributed by the first optical coupler after travelling different distances.

a set of optical waveguides with increasing lengths connecting the first optical coupler to the second optical coupler so as to enable the multiplexing/demultiplexing of signals transmitted, This set of optical waveguides is a key factor for demultiplexing because since they have varying lengths, the beams travelling through one guide or another also have varying path lengths.

Based on these elements, the invention further includes two components:

an adapted support for surface acoustic wave transmission for the acoustic excitation of:

either a set of optical waveguides connecting the first and second optical coupler these being sorted by increasing length, or the optical waveguides of the input ports, the excitable waveguides being spaced apart on the support.

at least one acoustic excitation transducer arranged on the support for surface acoustic wave transmission.

The acoustic excitation transducer enables the emission of a surface acoustic wave that propagates through the support. This support has to be composed of a material favouring the transmission of acoustic waves at the operating frequencies. The waveguides which are situated on the support adapted for the transmission of surface acoustic waves, preferably on the support, will also be excited acoustically and thus its refractive index will vary with said acoustic excitation.

Since acoustic excitation can be carried out on the guides connecting the first optical coupler and the second optical coupler or on the guides at the AWG input, the technical rule includes both possibilities. What is important is that during the transmission of the composite signal, or already separated in separate guides, acoustic excitation is performed on the support via which the signal is propagated to allow proper tuning.

Correct tuning is possible thanks to the solution covered by claim 1 which requires the acoustic excitation transducer to be adapted to excite with a transversal stationary acoustic wave the optical waveguides arranged on the support such that the acoustic wave, discretized at the cross sectional points of the optical waveguides excited acoustically, is linearized.

References to a linear section in a function is to be construed as a section where the behaviour is essentially linear and therefore the degree of deviation is of the same order as typical perturbations of the system.

Various ways of carrying out this technical solution are considered, as described in detail in the description of embodiments of the invention. The acoustic wave must be stationary and must travel transversally to the optical waveguides. The acoustic excitation transducer should be such that it can generate an acoustic wave of these characteristics because it has a dynamic range of sufficient response and its situation leads to a transverse and stationary wave. Thus the same acoustic wave sets a modified variation index for all the guides while maintaining a ratio in the modified refractive indices that allows proper tuning to be maintained.

The separation between the guides and the acoustic excitation propagation transversely with regard to the acoustic wave makes each guide observe a different point of the transversal stationary acoustic wave. The condition that makes it possible to maintain proper tuning is that the combination of acoustic excitation modes and spatial distribution of said guides results in a discretization of the acoustic wave such that in said discretization the wave appears as linearized.

According to embodiments of the invention, this objective can be accomplished in three ways.

A first embodiment combines two superimposed acoustic waves with different frequencies, one multiple of the other. The sum of the two components results in a distorted wave whose overall form at the discrete points set by the optical waveguides is linearized. It is possible to use more than one mode of vibration and in particular it is possible to make use of a Fourier series expansion of a triangular function to determine the amplitudes of each of the vibration modes of the acoustic wave emitted by the transducer. The more the overlapping vibration modes, the greater is the approximation to a triangular wave with linear behaviour.

This strategy is appropriate when the acoustic wavelength is large enough such that the set of optical waveguides (i.e., the whole width of the guides) are in a section of increasing or decreasing slope of the stationary acoustic wave that excites them.

A second embodiment uses high frequencies, such that the acoustic wavelengths are short compared to the guide spacing. In this case at least two close frequency waves overlap, in the form $\sin(f_0 x) + \sin((f_0 + \Delta f)x)$ with $\Delta f$ the frequency difference between them. In this case the resulting wave envelope is a linearized wave at the points where the optical waveguides are found.

A third embodiment uses a spatial distribution of optical waveguides wherein the spacing between guides is uneven. Given a uniform sinusoidal wave expressible in the form $y=\sin(x)$ and a discretization in the variable "y", this leads to a non-uniform distribution of the variable "x" with $x=\arcsin(y)$. Using a non-uniform distribution for waveguide separation following this strategy, that imposed by the function $x=\arcsin(y)$ wherein x is a variable discretized in accordance with a uniform grid, enables the optical guides to be excited acoustically such that the behaviour of the acoustic wave is shown (for optical waveguides) linearized. That is, if the discretized function values of this form are represented in a uniform grid, the representation of the function is linear.

An object of this invention include the particular configurations given by the dependent claims 2 to 12 which are considered included herein by reference.

Another object of this invention is an AWG device tuning method according to claim 13, included by reference herein, wherein the optical wave excitation only takes into account what the optical waveguides observe of the acoustic wave with which they are excited to change the refractive index.

An object of this invention includes the particular methods established by the dependent claims 14 to 21 which are considered included herein by reference.

DESCRIPTION OF THE DRAWINGS

These and other characteristics and advantages of the invention will become apparent from the following detailed description of preferred embodiments, given only by way of illustration and not limiting the scope of the invention, with reference to the accompanying figures.

DETAILED DESCRIPTION OF THE INVENTION

Figure 1:
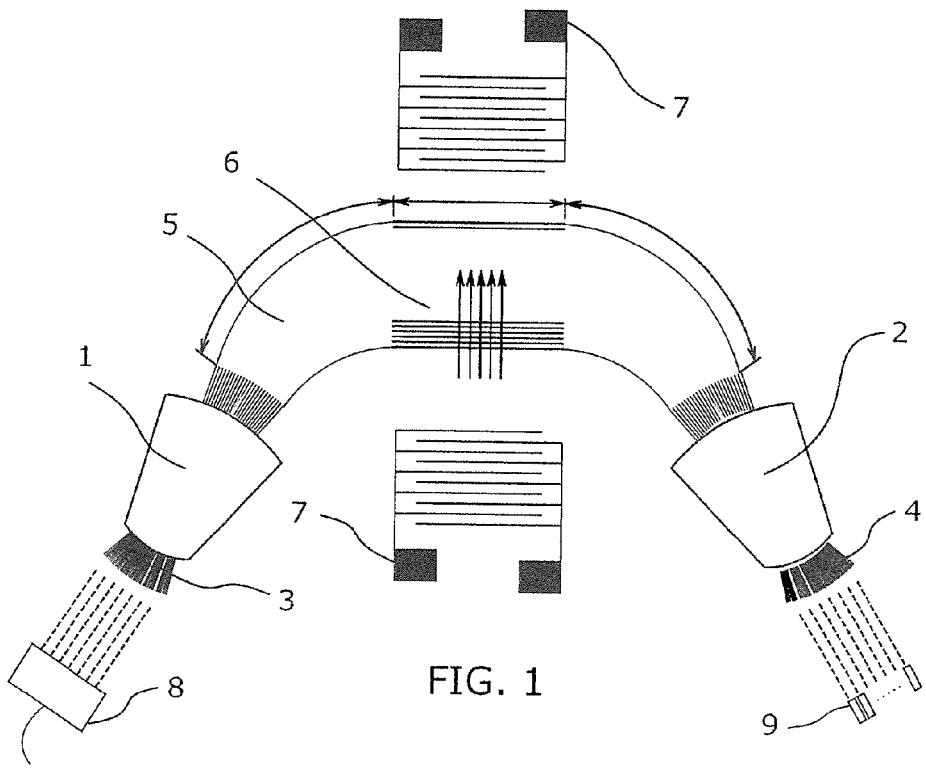
FIG. 1 This figure shows an embodiment of an AWG device according to the invention wherein the acoustic excitation is performed on the optical waveguides connecting the two optical couplers.

FIG. 1 shows a first embodiment of the invention. In this embodiment, a multiplexed composite signal reaches a switch (8) which enables the multiplexed signal to be injected into the various optical inputs (3) available on a first optical coupler (1).

This first optical coupler (1) distributes the input signal to a set of optical waveguides (5) with increasing lengths arranged between the first optical coupler (1) and a second optical coupler (2).

The optical signals that reach the second optical coupler (2) cover different distances thereby allowing through constructive interference diffraction the separation of the input signal in different output ports (4) located in the second optical coupler (2).

This same FIG. 1 shows a plurality of photodetectors (9) arranged in the output ports (4) of the second optical coupler (2). These photodetectors (9) allow reading each of the signals already separated from the rest.

Although what has been described in this example so far corresponds to a technical solution existing in the prior art, the embodiment further comprises a support (6) for the optical waveguides (5) with increasing lengths which allows the excitation of a surface acoustic wave. The acoustic wave that propagates through this support (6) will acoustically excite the waveguides (5). The acoustic excitation of the support (6) is performed by means of an acoustic transducer (7). Generating an acoustic stationary wave to excite a support (6) for the optical waveguides (3, 5) can be performed in any of the embodiments or by combining two acoustic transducers (7) facing each other with the support (6) in the middle or by combining a transducer (7) and an acoustic wave reflection element.

Regarding FIG. 1, for the sake of clarity, in order to observe a constant spacing between waveguides (5) in the region where they are excited acoustically, i.e. that such separation does not vary, the figure shows how the waveguides describe a curve to have different lengths but are parallel in the area of the support (6).

The transducer (7) is capable of exciting the support (6) and this in turn the waveguides (5) located on the support (6) so that the refractive index of the waveguides is modified allowing the AWG device tuning.

Figure 2:
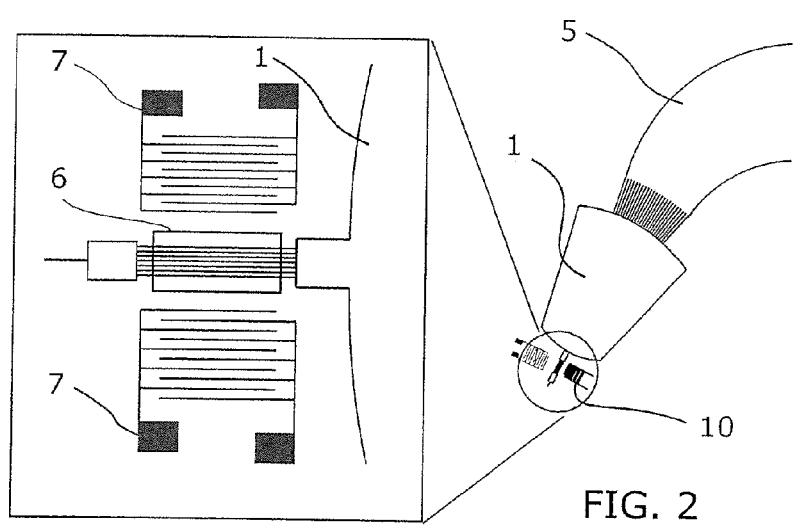
FIG. 2 This figure shows a detail of the AWG device input with a plurality of optical inputs. In this embodiment the excitation is at the input by modulating the waveguides connecting two multi-mode type interferometers (MMI).

FIG. 2 shows a variant wherein the excitation is performed on a set of waveguides that reach the input ports (3) and hence the change in refractive index is caused in this area before feeding the first optical coupler (1). It is known that a change in the light input position (using a different input port) in the optical coupler (1) results in a displacement of the wavelengths in the different output ports. Said displacement is proportional to the spatial variation in the input (proportional to the number of changes in the input position). Thus, a periodic scan in the signal injection in consecutive positions at the input causes a spectral scan at the output ports. This can be obtained by means of two multi-mode type interferometers (MMI) connected by a set of acoustically modulated waveguides that produce a change in the interference pattern of the second MMI periodically displacing the positions of constructive interference at the end of the MMI. In the configuration shown in FIG. 2, the end of the second MMI corresponds with the optical coupler (1) input.

According to claim 1, the proper tuning of the AWG through acoustic excitation is possible by establishing that the acoustic stationary wave propagates transversally to the waveguides, so that the acoustic wave, discretized at the points of the cross-section to the acoustically excited optical waveguides (3, 5) is linearized.

A cross section of the waveguides coincides with the direction of propagation of the acoustic wave. According to this cross section, the intersection with the waveguides determines points which are the so-called discretization points. Each guide receives a different excitation depending on its position. What matters is which acoustic wave observes the whole of the acoustically excited waveguides; and what they observe is a discretized wave.

Figure 3:
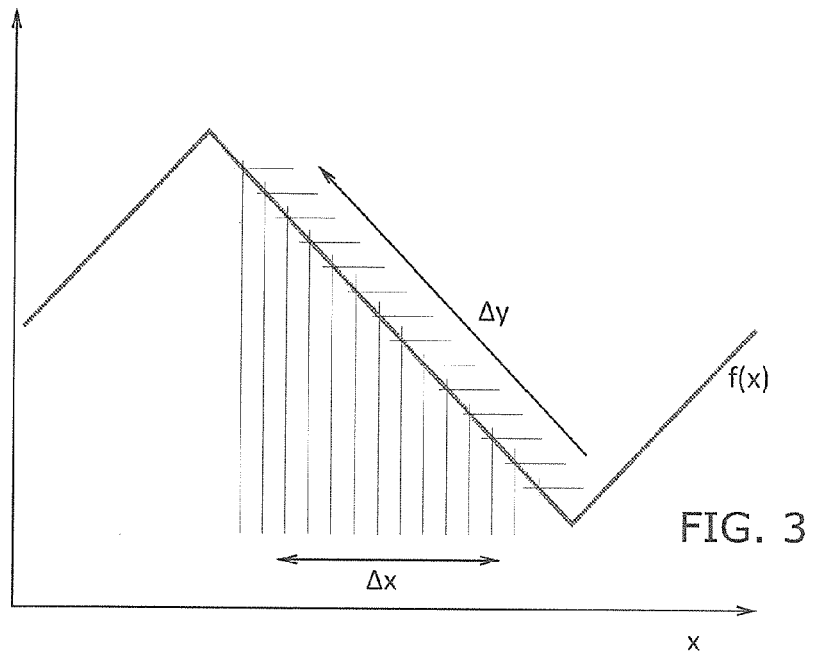
FIG. 3 This figure shows a triangular wave with a uniform discretization.

FIG. 3 shows a triangular wave. This triangular wave, based on the Fourier expansion, is expressible by an infinite sum of terms. The limit of the sum will be the triangular wave with straight sections of a given slope. The function f(x) is therefore expressible as: $f(x)=\Sigma_{i=0}^{\infty} a_i \sin(f_i x)$ wherein $f_i$ denotes various frequencies multiple of the fundamental frequency.

In this theoretical case where we have taken all the terms of the summation, the wave perfectly reproduces the straight sections. Thus, a discretization in the x-axis with uniform spacing also results in a uniform discretization in the y-axis. This is the situation shown in FIG. 3. In a practical case, it is sufficient if the sections are approximated by a straight section. Based on this we can take the acoustic wave consisting of two superimposed sine waves, preferably taking the frequencies and amplitudes according to the first two terms of the Fourier series expansion. Adding more terms will improve the linearization of the acoustic signal.

If the acoustic wave is linearized, the uniform distribution Δx which is a constant separation between optical waveguides (3, 5) will also have a linearized excitation.

Figure 4:
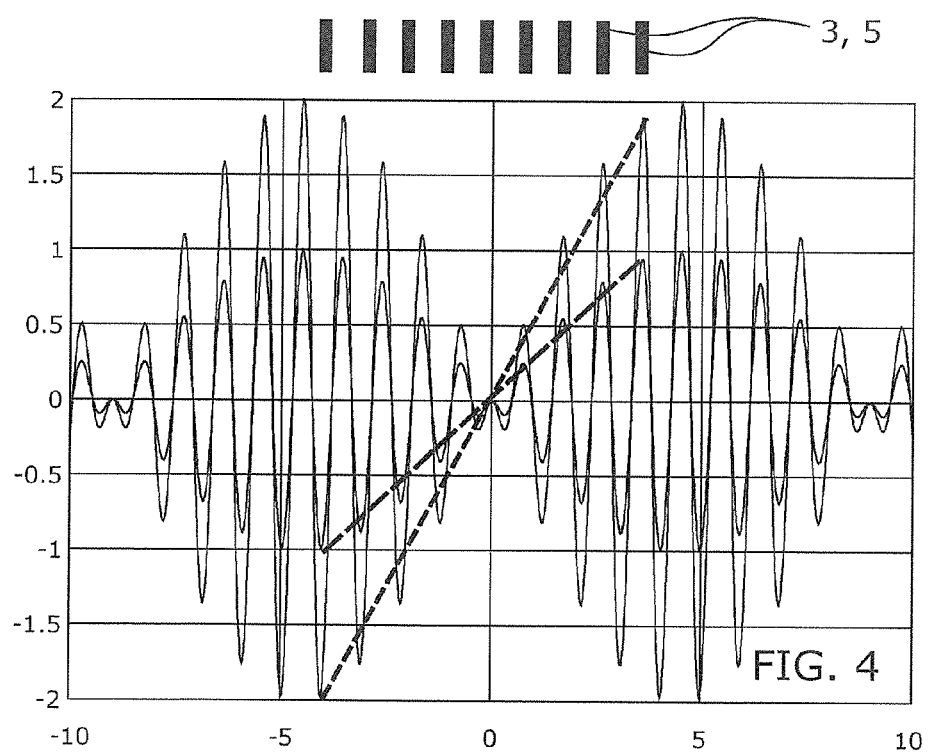
FIG. 4 This figure shows the superposition of two high and close frequency waves in the form $\sin(f_0 x)+\sin((f_0+\Delta f)x)$ which lead to a linearized envelope.

FIG. 4 shows two high frequency acoustic waves so that the wavelengths are comparable to the spacing between waveguides. The top of the graph shows by means of rectangles the positions of the equally spaced optical waveguides (3, 5). The two curves shown are the same acoustic wave at two different times. In each case, the excitation is performed by means of an acoustic wave which is formed by superimposing two adjacent frequency waves. This acoustic wave can be expressed as $\sin(f_0 x)+\sin((f_0+\Delta f)x)$ wherein Δf is the frequency difference.

The graph of FIG. 4, as mentioned above, shows the same acoustic stationary wave at two times. The envelope of the wave is a straight section highlighted by a bold dashed line. At another point in time, the slope is different. Since the graph shows two different times bold lines represent the straight sections with differing slopes corresponding to each time point.

With this acoustic excitation, the optical waveguides distributed along this linearized section will observe a linearized behaviour of the acoustic wave in accordance with the technical solution according to claim 1.

Figure 5:
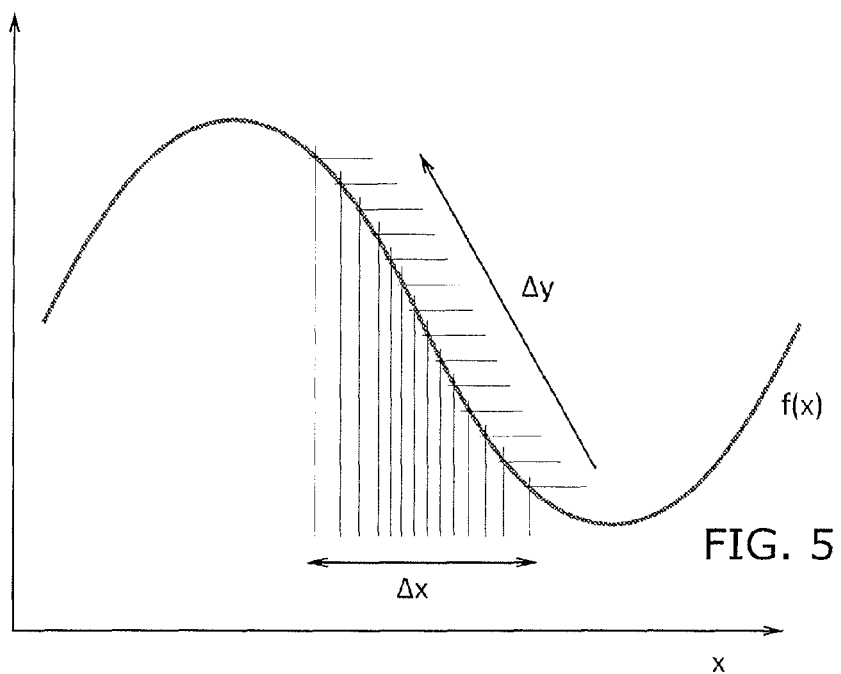
FIG. 5 This figure shows a sine wave with a discretization according to a non-uniform distribution in the X axis such that it results in a uniform discretization in the ordinate axis.

FIG. 5 shows another particular way of solving the problem. The acoustic wave is a sine wave, however, by suitably selecting a non-uniform spatial distribution (for example, according to the functional ratio x=arcsin(y)), the wave observed by the set of waveguides corresponds to a linearized acoustic excitation. Such linearized acoustic excitation is because if the optical waveguides (3, 5) were redistributed and evenly spaced, the discrete values observed by the optical waveguides (3, 5) would represent a linear function.

The three strategies used to acoustically excite a set of optical waveguides (3, 5) so that the guides receive a linearized excitation can be combined, for example, by constructing a partially linearized acoustic wave, which is applied to a support (6) containing a non-uniform spacing distribution between waveguides (3, 5) correcting the unlinearized part. The result would still be a technical solution according to claim 1.

This same strategy corresponds to the method claim 13 wherein the solution for AWG tuning is obtained by the acoustic excitation mode combined with the spatial distribution of the waveguides such that the latter observe an acoustic stationary wave, linearized at the spatial discretization points determined by the positions of the waveguides.

A tuneable AWG enables various applications of interest. Although the AWG does not essentially need to be acoustically tuneable—it may be tuneable by other techniques—the advantages of acoustic tuning allow devices integrating an acoustically tuned AWG to have a very short response time making such applications feasible.

Optical Spectrum Analyzer in Integrated Optics

An optical spectrum analyzer is an instrument which is used for measuring the distribution of optical power depending on the wavelength of an optical signal. One of the key parameters in this instrument is the spectral resolution bandwidth, which is the precision with which the wavelength measurement can be defined. This parameter is normally user-configurable, so that the power distribution depending on the wavelength can be measured in more or less wide steps, i.e. in larger or smaller resolution bandwidths respectively.

Figure 6:
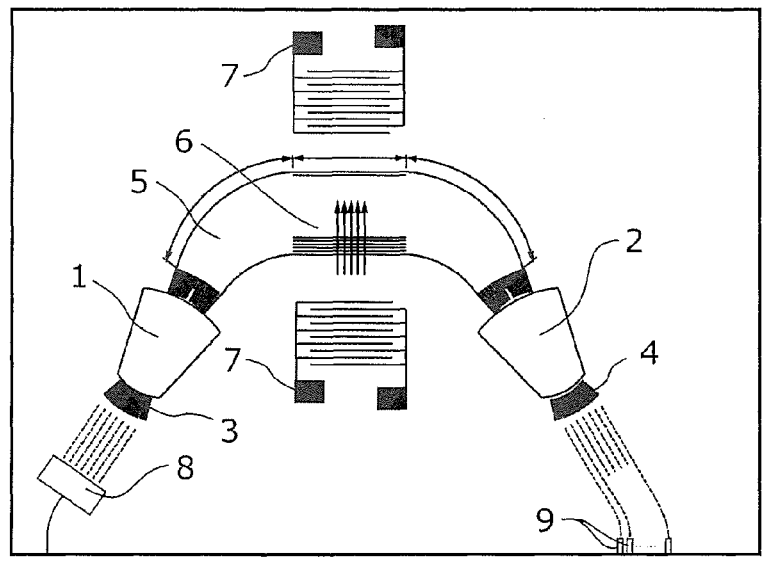
FIG. 6 This figure shows an example implementation of a device shown schematically by a rectangle comprising a tuneable AWG and which gives rise to an optical spectrum analyzer.

FIG. 6 shows a AWG tuner as described in FIG. 1 which has been equipped with an integrated optical switch (8) with a multiplexed input and a plurality of outputs connected to the input ports (3) of the first optical coupler (1); and photodetectors (9) in the output ports (4) of the second optical coupler (2).

The optical switch (8) makes it possible to select an input waveguide and in particular, each waveguide with a specific guide width. For its part, the AWG allows tuning varying the acoustic excitation. After selecting the input waveguide with the optical switch (8), the AWG tuning varying the acoustic excitation results in an optical spectrum analyzer. The resolution bandwidth of the spectrum analyzer is related, as detailed in the following paragraph, with the thickness of the input and output waveguides chosen, as well as with the design of the AWG without tuning and also with the tuning speed given by the frequency of the acoustic wave.

Detailed operation is as follows. Without applying acoustic excitation, the response of the AWG is well known: the different wavelengths present in an input waveguide are distributed in the output guides. In detail, for each output guide there is a range of wavelengths around a centre wavelength, of the whole set present in the input guide. That range is larger or smaller depending on the static design of the AWG, to be precise, it depends equally on the configuration of the array and on the width of the input and output waveguides in question. Applying an acoustic excitation makes it possible to change the centre wavelength of the range of wavelengths which, entering through a waveguide, is extracted by another. Thus, firstly a pair of input and output guides is chosen, and then the acoustic excitation is applied to the AWG. The result is a scan of the optical spectrum present in the input guide, collected in the output guide, with a resolution bandwidth associated with the input and output guide, the design of the AWG without tuning and the scanning speed given by the acoustic wave frequency.

The operation thus described is achieved using a single output waveguide to collect the entire spectrum of the input signal using acoustic tuning. However, there may be cases where the tuning range by means of an acoustic wave is not sufficient to scan the whole spectrum using a single output waveguide. Therefore the combined signal can be obtained, by electronic post-processing, of the different output guides, each collecting a portion of the spectrum of the input signal. That is, each of the output waveguides provides a limited portion of the spectrum of the input signal by running through the entire tuning range available. So, if a larger portion of available input spectrum needs to be obtained at the output, the output portions of all available outputs would be collected and assembled by post-processing, rebuilding the combined signal of all of them. This is possible because the spectrum provided by an output with certain tuning is close to or even overlaps the spectrum provided by another output in the presence of different tuning.

A Digital Signal Demultiplexer

A digital signal demultiplexer is a device which, taking an input signal, makes it possible to separate parts thereof in multiple outputs corresponding to different time intervals. Thus, if the input signal is composed of a combination of signals interspersed (multiplexed) in time, the demultiplexer separates each one in different outputs.

Figure 7:
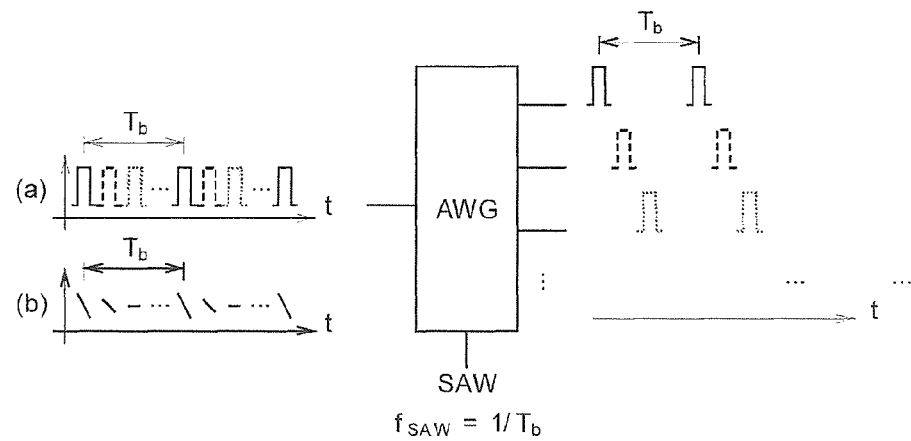
FIG. 7 This figure shows an AWG acting as a demultiplexer of a signal consisting of several multiplexed tributary signals.

FIG. 7 shows an acoustically tuneable AWG through a SAW (Surface Acoustic Wave). In this case there are control means (not shown in the figure) that determine the fundamental frequency of the acoustic wave $f_{saw}$ depending on the base bit rate $T_b$ ($f_{saw}=1/T_b$) of the digital signal entering at the left of the AWG, i.e. through its input (3) (the positional references are as shown in the figure).

Two graphs are shown to the left of the figure. Graph (a) schematically shows a pulse train indicating that the digital signal consists of a set of tributary signals. Different line patterns are used to distinguish the different tributary signals that form the digital signal. This same figure shows graph (b) with the evolution over time of sections of the slope of a triangular acoustic stationary wave at different times. A relationship of synchrony between the tributary signals and the acoustic wave is established, so that for each tributary signal the acoustic wave will show a different slope so each output will take place at a different output port (4) of the AWG.

If the optical digital signal entering the AWG comprises several tributary signals multiplexed in time with a base bit rate $T_b$, the control means for said synchrony establish a fundamental frequency of the acoustic wave $f_{saw}=1/T_b$.

The figure shows how the multiplexed signals are demultiplexed since each tributary signal comes from a different output port (4). This device thus formed is also a serial to parallel converter because data serially inserted into data sets can be separated from a digital signal (as many data units as output ports (4) are used for the separation) and can be transmitted in parallel.

Figure 8:
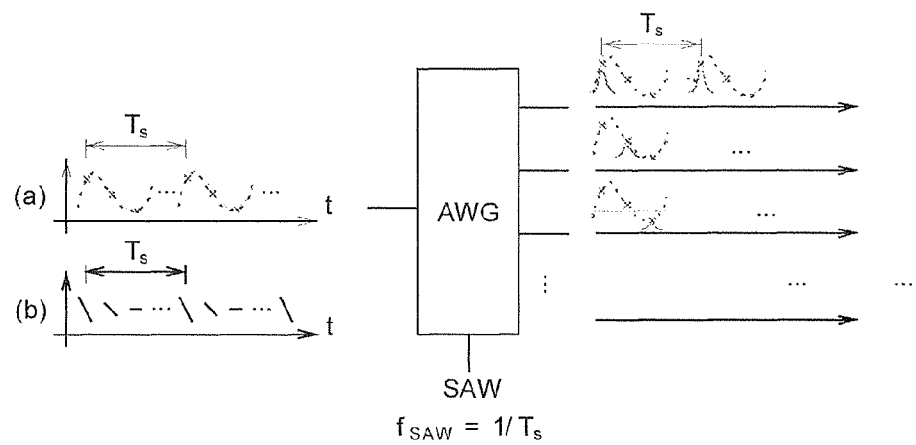
FIG. 8 This figure shows a generalization of the example shown in FIG. 7 wherein the optical input signal is arbitrary.

FIG. 8 shows a generalization of this application. In this case the optical input signal is arbitrary. The AWG device with SAW acoustic signal defined with a fundamental frequency $f_{saw}=1/T_s$ provides samples in the time domain of the optical input signal in the different outputs at a rate equal to the fundamental frequency of SAW. Here the base rate has been called $T_s$. That is, FIG. 8 shows a tuneable AWG able to decompose an arbitrary input signal in many outputs, each representing the input signal decomposed into samples of the signal for different time points (as many time points as outputs within the period $T_s$).

Digital Channel Exchanger

A digital channel exchanger is a device whereby it is possible, given N input signals (each called 'aggregate'), each composed of several multiplexed signals (each signal within an aggregate is a tributary signal), to transfer tributaries from one aggregate to another, providing N aggregates to the output, the individual composition of each output aggregate being different from the input aggregates, in some of the tributaries. Specifically, for example, a digital channel exchanger that uses two input aggregates (aggregate '$S_1$' and aggregate '$S_2$'), each in turn with two tributaries ($S_{1a}$, $S_{1b}$, $S_{2a}$, $S_{2b}$), would be used to transfer a tributary from aggregate '$S_1$' to '$S_2$' and vice versa. Thus, as an example, aggregate '$S_1$' would result in the tributaries $S_{1a}$ and $S_{2b}$, and aggregate '$S_2$' in the tributaries $S_{1a}$ and $S_{1b}$.

This embodiment uses an AWG comprising at least two optical inputs (3) and two optical outputs (4) whereby spectral bands can be interspersed. This embodiment is represented schematically in FIG. 9 for the particular case of two inputs and two outputs (called AWG 2×2), the concept being easily extendable to N inputs and N outputs (generally referred to as AWG N×N).

The AWG used in this configuration must be a cyclic spectral response design. The periodicity of the AWG response is previously described given its relevance in this particular case. Between an input guide listed as 'p' and an outlet guide listed as 'q', of an AWG there is more than one wavelength passband, passband meaning a centre wavelength and a wavelength range around it. The distance between two passbands is known as the free spectral range of the AWG bands, or free spectral range. The AWG response taking as input the same input guide 'p', but using a new output guide, adjacent to the previous one, and therefore listed as 'q+1', is also periodic the same as the previous one, but the spectrum position is displaced in a known amount in the AWG as spectral separation between channels.

Figure 9:
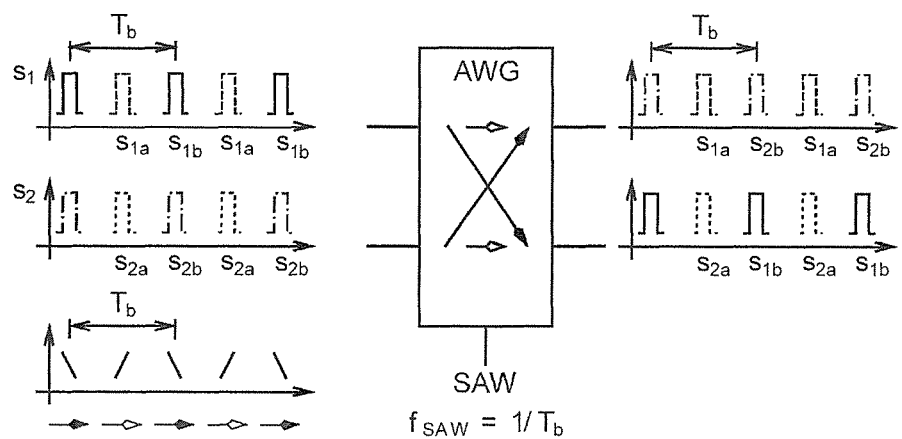
FIG. 9 This figure shows an AWG acting as a device that enables the collation of sets of spectral bands.

The AWG configuration required for the implementation of FIG. 9 is based on design-setting the free spectral range exactly N times, wherein N is the number of output guides, the spectral separation between the channels. Thus, for a fixed input guide, successively selecting each output guide, it is possible to scan the entire free spectral range, so that there are no zones of the spectrum of the input signal not extractable by any one of the output guides through the AWG.

According to this embodiment, an AWG 2×2 is used (listing the input and output ports as p=1.2 and q=1.2 respectively) designed to have cyclic spectral response as discussed above. Two digital input signals are used $S_1$, $S_2$) ($S_1$ in p=1 and $S_2$ in p=2) wherein in turn each has two multiplexed tributary signals ($S_{1a}$ and $S_{1b}$ in $S_1$; $S_{2a}$ and $S_{2b}$ in $S_2$). Both $S_1$ and $S_2$ are optical signals with the same optical wavelength $\lambda_0$. Without applying acoustic tuning, said wavelength $\lambda_0$ takes $S_1$ of p=1 to q=1 and takes $S_2$ of p=2 to q=2. When applying acoustic tuning, $S_1$ goes from p=1 to q=2 and $S_2$ from p=2 to q=1. If an acoustic wave excitation is applied whose fundamental frequency is synchronous with the bit rate of the tributaries, one of the tributary signals of $S_1$ ($S_{1a}$) appears in an optical output port (4) (q=1) and the other ($S_{1b}$) in the other optical output (4) (q=2). For the signal $S_2$, $S_{2a}$ appears in q=2, but $S_{2b}$ in q=1. This is because the acoustic wave excitation in this case causes a displacement in the wavelength of the multiple passbands of the response, so that, under acoustic excitation $\lambda_0$ is now a route between p=1 and q=2 and between p=2 and q=1. This is possible provided that the AWG design without tuning is cyclic as detailed above, and provided that the acoustic excitation produces a wavelength displacement equal to the free spectral range (in this embodiment it coincides with the channel spacing).

Similarly, when input S2 is in the second optical input port (3) the tributary signals appear separated in the same way but in interchanged optical output ports (4). In this case different patterns have been used for the lines that represent data with digital signal pulses (S1, S2) that identify at the output how intermixing occurs. Also, arrows with the tip filled or empty are used to indicate the direction of each set of signals according to the slope of the exciter acoustic wave shown in the graph under the drawing (S1, S2). In this graph of the acoustic wave, the filled or empty arrow indicates whether the slope is one or the other identifying if this acoustic excitation causes a change of the optical output port (4) or not respectively.

This configuration is combined with a SAW wave operating at a base bit rate $1/T_b$, wherein $T_b$ is the period where the two tributary signals are mixed, resulting in a temporary switch wherein one of the tributary signals multiplexed in signal 1 is exchanged with another in signal 2.

The invention claimed is:

1. A tunable AWG (Arrayed Waveguide Grating) device for signal multiplexing and demultiplexing comprising:
    one or more input ports consisting of optical waveguides,
    a plurality of output ports consisting of optical waveguides,
    a first optical coupler for optical input port mixing,
    a second optical coupler for the mixing and output of optical output ports,
    a set of optical waveguides with increasing lengths connecting the first optical coupler to the second optical coupler so as to enable the multiplexing/demultiplexing of signals transmitted,
    the tunable AWG device comprising:
    an adapted support for surface acoustic wave transmission for the acoustic excitation of either:
        a set of optical waveguides connecting the first and second optical coupler (these being sorted by increasing length, or
        the optical waveguides of the input ports, the excitable waveguides being spaced apart on the support, and
    at least one acoustic excitation transducer arranged on the support for surface acoustic wave transmission,
    wherein said acoustic excitation transducer is adapted to excite an acoustic standing wave transversal to the optical waveguides arranged on the support such that the acoustic wave, discretized at the points of the cross section of the acoustically excited optical waveguides is linearized.

2. The device of claim 1 wherein the acoustic excitation transducer is adapted to operate with at least two sine signals wherein the first sine signal has a fundamental frequency $f_0$ and the second sine signal has a frequency multiple of the fundamental $f_0$; and wherein the acoustic wavelength corresponding to the fundamental frequency $f_0$ is substantially greater than the spacing between guides.

3. The device of claim 2, wherein the acoustic excitation transducer is adapted to operate at different frequencies and multiple of the fundamental frequency $f_0$.

4. The device of either one of claim 2 or 3 wherein the amplitudes of the acoustic sine signals of the transducer are determined by the first coefficients of the Fourier series expansion of a triangular periodic signal.

5. The device of claim 1 wherein the transducer of acoustic excitation is adapted to operate with sine signals in the form $\sin(f_0 x)+\sin((f_0+\Delta f)x)$ wherein $f_0$ is the difference and $\Delta f$ the frequency difference, so that the envelope of the resulting acoustic signal is a periodic signal with increasing and decreasing straight sections; and wherein at least one of the straight sections is substantially larger than the entire width of all the waveguides acoustically excited.

6. The device of claim 1 wherein the distribution of the spacing between the waveguides acoustically excited is non-uniform such that the wave observed in operating mode by the set of guides corresponds to a linearized acoustic excitation.

7. The device of claim 1 wherein the support is adapted for transmitting surface acoustic waves is the assembly supporting optical guides connecting the first and second optical coupler.

8. The device of claim 1 wherein the support is adapted for surface acoustic wave transmission is the support of the optical waveguides arranged at the input of the first optical coupler.

9. The device of claim 8 wherein the acoustic wave transmission acts on a set of Mach-Zehnder interferometers (MZI) or Multi-mode type interferometers (MMI).

10. The device of claim 1 further comprising:
an integrated optical switch with a multiplexed input and a plurality of outputs connected to the input ports of the first optical coupler; and
photodetectors in the output ports of the second optical coupler for the scanning of the input spectrum.

11. A device according for the demultiplexing of an optical digital signal comprising a plurality of tributary signals multiplexed in time with a base bit rate $T_b$, wherein the device comprises:
at least one optical input port and a number of optical output ports coinciding with the number of tributary signals multiplexed in time in the input signal; and,
control means adapted for the generation of an acoustic wave (SAW) that excites the AWG in a triangular form such that $f_{saw}=1/T_b$ wherein $f_{saw}$ is the fundamental frequency of the acoustic wave.

12. The device of claim 11 wherein the number of inputs and outputs is two.

13. A method for tuning a tunable AWG device for multiplexing and demultiplexing signals, the method comprising:
providing one or more input ports consisting of optical waveguides,
providing a plurality of output ports consisting of optical waveguides,
providing a first optical coupler for optical input port mixing,
providing a second optical coupler for the mixing and output of optical output ports,
providing a set of optical waveguides with increasing lengths connecting the first optical coupler with the second optical coupler so as to enable the multiplexing/demultiplexing of signals transmitted,
providing a support adapted for surface acoustic wave transmission for the acoustic excitation of:
either a set of optical waveguides connecting the first and second optical coupler these being sorted by increasing length, or
the optical waveguides of the input ports; the excitable waveguides being spaced apart on the support,
wherein a standing acoustic excitation is provided on the support adapted for transmitting surface acoustic waves such that the acoustic standing wave is transverse to the guides arranged on the support and both the configuration of the acoustic wave and the spatial distribution of the acoustically excited guides are such that the acoustic wave discretized in points of the cross section of the acoustically excited optical waveguides is linearized.

14. The method of claim 13, wherein the acoustic wave used in the acoustic excitation is linearized by combining two or more acoustic sine waves, with frequencies multiple of a fundamental frequency, superposed so that their amplitudes are selected according to the first coefficients of the Fourier series expansion of the function to be linearized.

15. The method of claim 13, wherein the acoustic wave used in acoustic excitation is linearized by combining two or more acoustic sine waves in the form $\sin(f_0 x)+\sin((f_0+\Delta f)x)$ wherein $f_0$ the frequency and $\Delta f$ the frequency difference, so that the envelope of the resulting wave is linearized.

16. The method of claim 13, wherein the distribution of spacing between the acoustically excited waveguides is non-uniform so that a sine wave is discretized as a linearized wave in a uniform discretization.

17. The method of claim 13 wherein the acoustic wave is linearized and the acoustically excited waveguides are arranged according to a non-uniform spacing distribution according to claim 16 to linearize those sections of the acoustic wave that require linearization.

18. A method for scanning the input signal spectrum using a tunable AWG device, the method comprising:
providing one or more input ports consisting of optical waveguides,
providing a plurality of output ports consisting of optical waveguides,
providing a first optical coupler for optical input port mixing,
providing a second optical coupler for the mixing and output of optical output ports,
providing a set of optical waveguides with increasing lengths connecting the first optical coupler with the second optical coupler so as to enable the multiplexing/demultiplexing of signals transmitted,
providing a support adapted for surface acoustic wave transmission for the acoustic excitation of:
either a set of optical waveguides connecting the first and second optical coupler these being sorted by increasing length, or
the optical waveguides of the input ports; the excitable waveguides being spaced apart on the support,
wherein a standing acoustic excitation is provided on the support adapted for transmitting surface acoustic waves such that the acoustic standing wave is transverse to the guides arranged on the support and both the configuration of the acoustic wave and the spatial distribution of the acoustically excited guides are such that the acoustic wave discretized in points of the cross section of the acoustically excited optical waveguides is linearized,
and additionally providing:
an integrated optical switch with a multiplexed input and a plurality of outputs connected to the input ports of the first optical coupler; and,
photodetectors at the output ports of the second optical coupler such that the various inputs are sampled wherein each input is tuned to scan the input spectrum.

19. A method for demultiplexing an optical digital signal comprising a plurality of tributary signals multiplexed in time of a base bit rate $T_b$ using a tunable AWG device, said AWG device comprising at least an optical input port and a number of optical output ports coinciding with the number of tributary signals multiplexed in time in the input signal, wherein the AWG is operative to generate an acoustic wave (SAW) that excites the AWG in a triangular form such that $f_{saw}=1/T_b$ wherein $f_{saw}$ is the fundamental frequency of the acoustic wave to result in the separation of each tributary signal through a different output port.

20. A method of optical signal sampling using a tunable AWG device, said tunable AWG device comprising at least one optical input port and a number of optical output ports, wherein the tunable AWG device is operative to generate an acoustic wave (SAW) that excites the AWG in a triangular form such that $f_{saw}=1/T_b$ wherein $f_{saw}$ is the fundamental frequency of the acoustic wave to result in the separation in different output ports of samples taken over a period of time $T_b$.

21. A method of spectral band interspersion between two lines carrying the respective signals S1 and S2, each carrying two tributary signals multiplexed in time with a base bit rate $T_b$; said spectral band interspersion being carried out using a tunable AWG device, said tunable AWG device comprising two optical input ports and two optical output ports, wherein:
   the tunable AWG device has a cyclical design,
   the acoustic excitation produces a displacement in wavelength equal to the free spectral range, and
   an acoustic wave (SAW) is generated that excites the AWG in a triangular form such that $f_{saw}=1/T_b$ wherein $f_{saw}$ is the fundamental frequency of the acoustic wave to result in a temporal switch place wherein one tributary signals multiplexed in the signal $S_1$ is exchanged for another tributary signal of the signal $S_2$.

* * * * *